United States Patent Office 3,287,357
Patented Nov. 22, 1966

3,287,357
NOVEL STEROIDS OF THE ANDROSTANE SERIES
William J. Wechter and Fred Kagan, Kalamazoo, Mich.,
assignors to The Upjohn Company, Kalamazoo, Mich.,
a corporation of Delaware
No Drawing. Filed Dec. 16, 1963, Ser. No. 330,560
11 Claims. (Cl. 260—239.55)

This invention relates to novel steroids of the androstane series.

The novel compounds of this invention are produced according to the following reaction scheme:

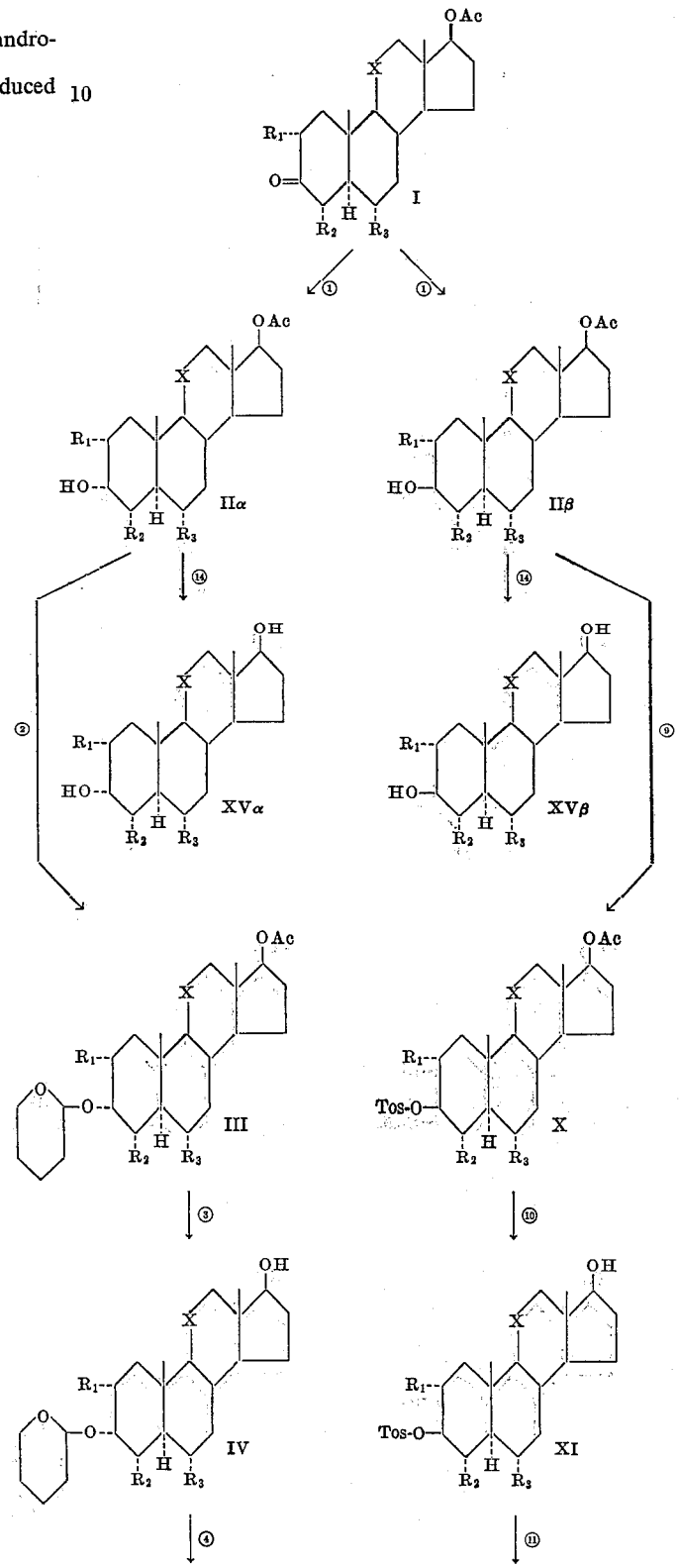

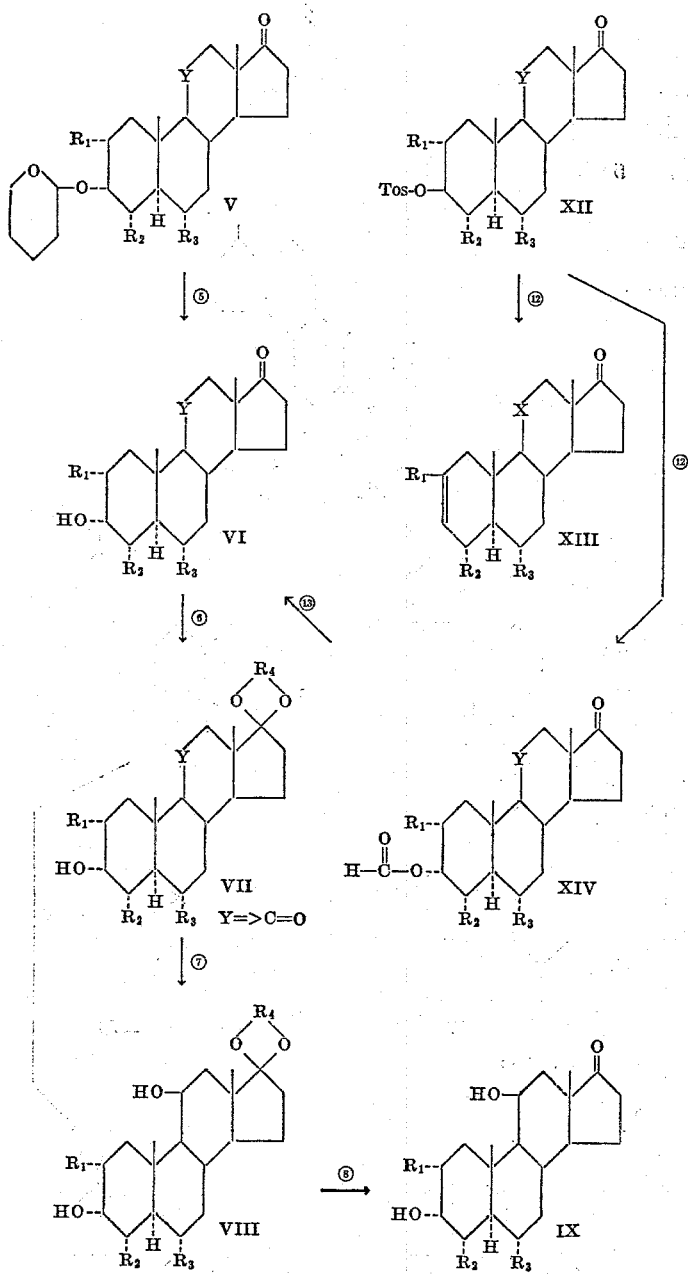

wherein $R_1$ is selected from the group consisting of hydrogen and fluoro, with the proviso that when $R_1$ is fluoro $R_2$ and $R_3$ are hydrogen and X is selected from the group consisting of

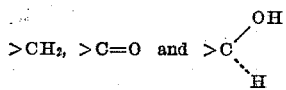

and Y is selected from the group consisting of $>CH_2$ and $>C=O$; $R_2$ is selected from the group consisting of hydrogen and methyl, with the proviso that when $R_2$ is methyl $R_1$ and $R_3$ are hydrogen and X and Y are $>CH_2$; $R_3$ is selected from the group consisting of hydrogen and methyl, with the proviso that when $R_3$ is methyl $R_1$ and $R_2$ are hydrogen, X is selected from the group consisting of

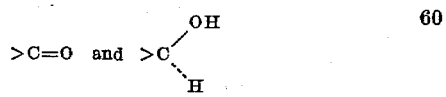

and Y is selected from the group consisting of $>CH_2$ and $>C=O$; and when $R_1$, $R_2$ and $R_3$ are hydrogen X is selected from the group consisting of

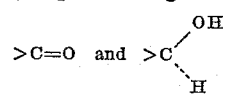

and Y is $>C=O$; Ac is the acyl radical of an organic carboxylic acid, preferably a hydrocarbon carboxylic acid containing from 1 to 12 carbon atoms, inclusive; $R_4$ is an alkylene radical containing not more than 8 carbon atoms, inclusive, and the attaching oxygen to carbon bonds are separated by a chain of at least 2 and not more than 3 carbon atoms; and Tos is the tosyl radical, preferably the p-tosyl radical.

The novel compounds of Formulae IIα, IIβ, III, IV, V, VI, VII, VIII, IX, X, XI, XII, XIII, XIV, XVα and XVβ possess therapeutic properties useful in the treatment of animals, such as mammals and birds, and are particularly useful in the treatment of valuable domestic animals.

Each possesses for example, hypocholesteremic activity. In addition each possesses hypolipemic, antiatherosclerotic, anticoronary thrombolytic, antiartery plaque deposition and antihypertensive activity.

The compounds of Formula XIII, in addition to the activities stated above, also possess anti-estrogenic activity.

Administration of the compounds of Formulae IIα, IIβ, III, IV, V, VI, VII, VIII, IX, X, XI, XII, XIII, XIV, XVα and XVβ can be in conventional dosage forms, such as pills, tablets, capsules, syrups, or elixirs for oral use, or in liquid forms which are suitable for injectable products. They can also be administered topically in the form of ointments, creams, lotions, and the like, with or without coacting antibiotics, germicides or other materials forming advantageous combinations therewith.

The novel products of this invention are produced by a process which comprises treating the compounds of Formula I, such as 2α-fluoro-17β-hydroxy-5α-androstan-3-one 17-acetate with a reducing agent to obtain the compounds of Formula IIα and IIβ, such as 2α-fluoro-3α,17β-dihydroxy-5α-androstane 17-acetate and 2α-fluoro-3β,17β-dihydroxy-5α-androstane 17-acetate, respectively.

The conversion of the compounds of Formula I to the compounds of Formulae IIα and IIβ, Reaction 1, is carried out using a reducing agent, for example, lithium aluminum tri-t-butoxide hydride, sodium borohydride, diborane, lithium aluminum triethoxy hydride, potassium borohydride, and the like, in an inert organic solvent, for example, lithium aluminum tri-t-butoxide hydride in tetrahydrofuran, ether, diglyme, and the like. Advantageously the reaction is carried out at temperatures from 0° to 100° C. for ¼ to 2 hours with a temperature of 25° C. for ½ hour being preferred. The compounds of Formulas IIα and IIβ are recovered following Reaction 1 by fractional crystallization, chromatography of the total crude reaction product on acid washed alumina, Florisil (synthetic magnesium silicate) silica gel, or silicic acid, eluting with commercial hexanes containing increasing amounts of acetone or benzene containing increasing amounts of methanol, Craig countercurrent partition separation, column partition chromatography, preparative paper chromatography, thin-layer chromatography, or a combination of these.

Reaction 2, the conversion of the compounds of Formula IIα, such as 2α-fluoro-3α,17β-dihydroxy-5α-androstane 17-acetate, to the compounds of Formula III, such as 2α-fluoro-3α,17β-dihydroxy-5α-androstane 3-dihydropyranyl ether 17-acetate is carried out by reacting the starting steroid of this step with dihydropyran in the presence of a Lewis acid, such as boron trifluoride etherate, p-toluenesulfonic acid, sulfuric acid, zinc chloride, and the like. Advantageously, the reaction can be carried out in the presence of an organic solvent, such as ether, benzene, and the like. The reaction is carried out at temperatures of from 0° to 80° C., with a temperature of 25° C. being preferred. The thus-obtained compounds of Formula III are recovered from the mixture by conventional methods, such as, for example, dilution of the reaction mixture with water, extraction with a water immiscible solvent, such as methylene chloride, ethyl acetate, benzene, toluene, and the like, or any of the methods described above for the recovery of the compounds of Formulas IIα and IIβ. Alternatively, the entire crude product obtained from Reaction 2 can be used in the subsequent hydrolysis step, Reaction 3.

Reaction 3, the hydrolysis of the compounds of Formula III, such as 2α-fluoro-3α,17β-dihydroxy-5α-androstane 3-dihydropyranyl ether 17-acetate, to the compounds of Formula IV, such as 2α-fluoro-3α,17β-dihydroxy-5α-androstane 3-dihydropyranyl ether, is carried out in an alkaline aqueous medium using relatively water soluble alkali metal carbonates, alkaline earth metal carbonates, alkali metal hydroxides, alkaline earth hydroxides, e.g., sodium or potassium carbonate, calcium carbonate, sodium or potassium hydroxide, calcium hydroxide, and the like, preferably potassium carbonate. Advantageously there is added to the alkaline aqueous medium an inert water-miscible organic solvent, such as methanol, ethanol, isopropyl alcohol, and the like, with methanol being preferred. The reaction is carried out at temperatures of 10° to 100° C. for 1 to 20 hours. The compounds of Formula IV are recovered from the reaction mixture by the methods described above for the recovery of the compounds of Formula III. Alternatively, the crude compounds of Formula IV (wherein the group at the 11-position is $>CH_2$ or $>C=O$) can be used in the subsequent oxidation step, Reaction 4.

Reaction 4, the oxidation of the compounds of Formula IV (wherein the 11-group is $>CH_2$ or $>C=O$), such as 2α-fluoro-3α,17β-dihydroxy-5α-androstane 3-dihydropyranyl ether, to the compounds of Formula V, such as 2α - fluoro - 3α-hydroxy-5α-androstan-17-one 3-dihydropyranyl ether is carried out by reacting the starting steroid of this step with an oxidizing agent in the presence of an organic solvent. Suitable oxidizing agents are chromic anhydride-pyridine complex, chromic anhydride/sulfuric acid, sodium dichromate, and the like, and suitable solvents are pyridine, acetone, acetone-water, and the like, with chromic anhydride-pyridine complex being preferred. The reaction is carried out at temperatures of 0° to 50° C. for 2 to 20 hours. The compounds of Formula V are recovered from the reaction mixture by the methods described above for the recovery of the compounds of Formula III. Alternatively, the crude compounds of Formula V can be used in the subsequent step, the removal of the dihydropyranyl ether group, without further purification.

Reaction 5, the removal of the dihydropyranyl ether group, is carried out by treating the compounds of Formula V, such as 2α - fluoro - 3α-hydroxy-5α-androstan-17-one 3-dihydropyanyl ether, with an acid in the presence of an organic solvent to obtain the compounds of Formula VI, such as 2α-fluoro-3α-hydroxy-5α-androstan-17-one. Preferably the acid is a mineral acid, such as hydrochloric, hydrobromic, sulfuric acids, and the like. Suitable solvents are acetone-water, methanol-water, dimethylsulfoxide-water, dimethylformamide-water, and the like. The reaction is conveniently carried out at a temperature of 10° to 50° C. for from 5 to 50 hours. The compounds of Formula VI are recovered from the reaction mixture by the methods described above for the recovery of the compounds of Formula III.

Reaction 6, the formation of the 17-ethylene ketal, is carried out by treating the compounds of Formula VI, such as 2α-fluoro-3α-hydroxy-5α-androstan-17-one, with ethylene glycol, in the presence of a strong acid such as p-toluenesulfonic acid, ortho-chlorobenzenesulfonic acid, sulfuric acid, and the like, to produce the compounds of Formula VII, such as 2α-fluoro-3α-hydroxy-5α-androstan-17 - one 17 - ethylene ketal.

Similarly the compounds of Formula VI can be allowed to react with other 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkene diols of the formula:

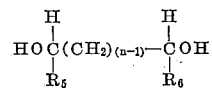

wherein $n$ is an integer having a value from one to two inclusive, $R_5$ and $R_6$ each represent hydrogen or lower alkyl radicals containing up to six carbon atoms and wherein the total number of carbon atoms in the alkane diol is up to and including 8 carbon atoms, to obtain the corresponding 17-alkylene ketals of Formula VII. Advantageously the 17-ketalization is carried out in the presence of an organic solvent such as benzene, toluene, xylene, and the like. The compounds of Formula VII are recovered from the reaction mixture by the methods described above for the recovery of the compounds of Formula III. Alternatively, the crude product of Reaction 6, the compounds of Formula VII where the 11-group is keto, can be used in the subsequent reduction step.

Reaction 7, the reduction of the 11-keto group to the 11β-hydroxy group, is carried out by treating the compounds of Formula VII where the 11-group is keto, such as 2α-fluoro-3α-hydroxy-5α-androstane - 11,17 - dione 17-ethylene ketal, with a reducing agent to obtain the compounds of Formula VIII, such as 2α-fluoro-3α,11β-dihydroxy-5α-androstan-17-one 17-ethylene ketal. Suitable reducing agents are lithium aluminum hydride, sodium borohydride, potassium borohydride, diborane, and the like. The reaction is carried out in an inert organic solvent, such as tetrahydrofuran, ether, diglyme, and the like, at temperatures of from 20° to 100° C. for 1 to 80 hours. Similarly other 11-keto 17-alkylene ketals can be substituted for the 11-keto 17-ethylene ketals described above to yield the corresponding 11β-hydroxy 17-alkylene ketals. The compounds of Formula VIII are recovered from the reaction mixture by the methods described above for the recovery of the compounds of Formula III. Alternatively, the crude product of Reaction 7 can be used in the subsequent deketalization step.

Reaction 8, the deketalization step, is carried out by treating the compounds of Formula VIII, such as 2α-fluoro- 3α,11β-dihydroxy-5α-androstan-17-one 17-ethylene ketal with an acid, such as acetic acid, dilute mineral acids, e.g., hydrochloric and sulfuric acids, and the like, to obtain the compounds of Formula IX, such as 2α-fluoro-3α,11β-dihydroxy-5α-androstan-17-one. The reaction is carried out at temperatures of from 10° to 50° C. for 2 to 20 hours. The compounds of Formula IX are recovered from the reaction mixture by the methods described above for the recovery of the compounds of Formula III.

Reaction 9, the formation of the 3-tosylate, is carried out by reacting the compounds of Formula IIβ, such as 2α-fluoro-3β,17β-dihydroxy-5α-androstane 17-acetate with o-, m- or p-toluenesulfonyl chloride, preferably p-toluenesulfonyl chloride, in the presence of a weak base, such as pyridine, collidine, dimethylaniline, and the like, to obtain the compounds of Formula X, such as 2α-fluoro-3β,17β-dihydroxy-5α - androstane 3 - tosylate 17 - acetate. The reaction is carried out at a temperature of 10° to 50° C. for 2 to 50 hours. The compounds of Formula X are recovered from the reaction mixture according to the procedures described above for the recovery of the compounds of Formula III.

Reaction 10, the conversion of the 3-tosylate 17-acetate to the 3-tosylate 17-alcohol, is carried out by treating the compounds of Formula X, such as 2α-fluoro-3β,17β-dihydroxy-5α-androstane-3-tosylate 17-acetate with a Lewis acid, such as hydrochloric, hydrobromic, sulfuric acids, boron trifluoride, and the like, in the presence of an alkanol, such as methanol, ethanol, and the like, to obtain the compounds of Formula XI, such as 2α-fluoro-3β,17β-dihydroxy-5α-androstane 3-tosylate. The reaction is carried out at temperatures of from 0° to 50° C. for 5 to 50 hours. The compounds of Formula X are recovered from the reaction mixture according to procedures described above for the recovery of the compounds of Formula III. Alternatively, the crude compounds of Formula XI can be used in the subsequent oxidation step without further purification.

Reaction 11, the oxidation of the compounds of Formula XI, such as 2α-fluoro-3β,17β - dihydroxy - 5α - androstane 3-tosylate, to produce the compounds of Formula XII, such as 2α-fluoro-3β-hydroxy-5α-androstan-17-one 3-tosylate, is carried out in the manner described above for the production of the compounds of Formula V from the compounds of Formula IV.

In Reaction 12, the compounds of Formula XII, such as 2α-fluoro-3β-hydroxy-5α-androstan-17-one 3-tosylate are treated with a mixture of dimethylformamide and an alkali metal formate, such as sodium, potassium or lithium formate, at a temperature of 60° to 220° C. for 2 to 70 hours to produce a mixture of the compounds of Formula XIII, such as 2-fluoro-5α-androst-2-en-17-one, and Formula XIV, such as 2α-fluoro-3α-hydroxy-5α-androstan-17-one 3-formate. In those instances where the 3-formylation proceeds more easily, i.e., when R₁ is hydrogen, the alkali metal formate can be omitted from the reaction and a reaction temperature of 80°–85° C. for 2 to 5 days can be used.

In Reaction 13, the mixture comprising the compounds of Formula XIII, such as 2-fluoro-5α-androst-2-en-17-one, and Formula XIV, such as 2α-fluoro-3α-hydroxy-5α-androstan-17-one 3-formate, is subjected to chromatography during which the compounds of Formula XIV are converted to the compounds of Formula VI, such as 2α-fluoro-3α-hydroxy-5α-androstan-17-one, while the compounds of Formula XIII remain unchanged. The chromatography also effects the separation of the compounds of Formulas XIII and VI from each other. The compounds of Formulas XIII and VI can be further purified using the methods described above, e.g., further chromatography, recrystallization and the like.

Reaction 14, the conversion of the compounds of Formula IIα, such as 2α-fluoro-3α,17β-dihydroxy-5α-androstane 17-acetate, and IIβ, such as 2α-fluoro-3β,17β-dihydroxy-5α-androstane 17-acetate, to the compounds of Formulas XVα, such as 2α-fluoro-3α,17β-dihydroxy-5α-androstane, and XVβ, such as 2α-fluoro-3β,17β-dihydroxy-5α-androstane, is carried out according to procedures well known in the art for the conversion of androstane 17-acylates to androstane 17-alcohols as shown in U.S. Patent 2,849,464.

The following preparations and examples illustrate the best method contemplated by the inventors for carrying out their invention.

PREPARATION 1

*11-Ketotestosterone*

A solution is prepared containing in 100 ml. of pyridine 10 g. of 11β-hydroxytestosterone and 50 ml. of acetic anhydride. The solution is allowed to stand at room temperature (about 24° C.) for a period of 18 hours and is then poured into 1000 ml. of ice water. The aqueous mixture is allowed to stand overnight and refrigerated between 0° to 5° C. and is thereupon filtered the next day and the precipitated material, thus collected, is twice recrystallized from aqueous methanol to give pure 11β-hydroxytestosterone 17-acetate.

A solution is prepared containing in 100 ml. of acetic acid 6 g. of the thus obtained 11β-hydroxytestosterone 17-acetate, 3 g. of chromic anhydride and 4 ml. of water. This mixture is allowed to stand at room temperature for a period of 4 hours whereafter 20 ml. of methanol is added. The thus obtained mixture is then poured into 1000 ml. of water and ice and the aqueous portion extracted with three 300-ml. portions of methylene chloride. The methylene chloride extracts are combined, washed with dilute sodium bicarbonate solution and water, dried over anhydrous sodium sulfate, evaporated, and three times recrystallized from aqueous methanol to obtain 11-ketotestosterone 17-acetate.

A solution is prepared of 3 g. of the thus obtained 11-ketotestosterone 17-acetate in 200 ml. of one normal sodium hydroxide in 90 percent methanol—10 percent water. The resulting mixture is allowed to stand at room temperature for a period of 6 hours and thereupon poured into 1000 ml. of ice water, neutralized by the addition of dilute acetic acid, and the thus obtained mixture extracted three times with 500-ml. portions of methylene chloride. The methylene chloride extracts are combined, washed with water, dried over anhydrous sodium sulfate and evaporated to give a residue. The residue is then recrystallized three times from aqueous acetone to give pure 11-ketotestosterone.

PREPARATION 2

*2α-Fluoro-17β-Hydroxy-4-Androsten-3-One*

To a solution of 5.76 g. of testosterone in 100 ml. of tertiary butyl alcohol at 65° C. was added 5.45 ml. of ethyl oxalate and 6.67 ml. of commercial 25% sodium methoxide in methanol. After stirring for one-half hour, the now deep green solution was cooled to 25°–30° C. and 300 ml. or ether was added. The sodium enolate of 2-ethoxyoxalyl-17β-hydroxy-4-androsten-3-one which precipitated was filtered in a dry atmosphere and dried in a vacuum desiccator over calcium chloride for about 3 hours.

The dried sodium enolate was then dissolved in 170 ml. of methanol, the solution cooled to −10° C. and to it was then slowly added an ice-cold solution of 3.2 g. of perchloryl fluoride in 100 ml. of methanol. The solution was stirred for 15 minutes. The thus-produced 2-fluoro-2-ethoxyoxalyl-17β-hydroxy - 4 - androsten-3-one was decomposed by adding 7.0 ml. of 25% methanolic sodium methoxide to the solution. After one-half hour, ten drops of acetic acid was added, the solution filtered and the filtrate concentrated on a warm-water bath under reduced pressure to about a third of the original volume. The concentrate was diluted to about one liter with cold water and after about an hour the resulting precipitate was collected, washed with water, and dried in a vacuum desiccator. The 4.58 g. of 2α-fluoro-17β-hydroxy-4-androsten-3-one thus obtained was purified by chromatography on a column of 200 g. of magnesium silicate which was eluted with hexanes plus 10% acetone. Two recrystallizations from acetone gave solvated 2α-fluoro-17β-hydroxy-4-androsten-3-one melting at 161°–162° C. after losing the solvent of crystallization at 110° C.

*Analysis.*—Calcd. for $C_{19}H_{27}FO_2$: C, 74.47; H, 8.88; F, 6.2. Found: C, 74.54; H, 9.12; F, 6.3.

Following the procedure of Preparation 2 but substituting a stoichiometric equivalent weight of 11β,17β-dihydroxy-4-androsten-3-one (11β - hydroxytestosterone) as starting compound, there is thus produced 2α-fluoro-11β,17β-dihydroxy-4-androsten-3-one.

Similarly, 17β-hydroxy - 4 - androstene-3,11-dione (11-ketotestosterone) is converted to 2α-fluoro-17β-hydroxy-4-androstene-3,11-dione.

PREPARATION 3

*2α-Fluoro-17β-Hydroxy-5α-Androstan-3-One*

A solution of 5.0 g. of 2α-fluoro-17β-hydroxy-4-androsten-3-one in 190 ml. of 95% ethanol containing 0.5 ml. of 5% palladium on charcoal catalyst and 0.5 ml. of concentrated hydrochloric acid was shaken in an atmosphere of hydrogen at 2 atmospheres pressure. The theoretical amount of hydrogen was absorbed within a few minutes. After removing the catalyst by filtration through a bed of diatomaceous earth, the clear, colorless solution was evaporated to dryness on a warm water bath at reduced pressure. The residue was dissolved in methylene chloride and passed over a column of 200 g. of magnesium silicate (Florisil). The column was eluted with 400-ml. fractions; the first eight consisting of hexanes (Skellysolve B) plus 5% acetone and the next eight consisting of hexanes plus 8% acetone. Fractions 10 to 15 contained 2.26 g. of crystalline product which was crystallized twice from a mixture of ethyl acetate and hexanes and once from ethyl acetate to give 2α-fluoro-17β-hydroxy-5α-androstan-3-one melting at 201–205.5° C. A further recrystallization raised the melting point to 203–205.5° C. and gave product having the analysis below.

*Analysis.*—Calcd. for $C_{19}H_{29}FO_2$: C, 73.99; H, 9.48; F, 6.61. Found: C, 73.86; H, 9.66; F, 6.24.

Following the procedure of Preparation 3, but substituting a stoichiometric equivalent amount of 6α-methyl-17β-hydroxy-4-androsten-3-one as the starting steroid there is thus produced 6α-methyl - 17β - hydroxy-5α-androstan-3-one.

Similarly,

17β-hydroxy-4-androstene-3,11-dione,
2α-fluoro-17β-hydroxy-4-androstene-3,11-dione,
6α-methyl-17β-hydroxy-4-androstene-3,11-dione,
11β,17β-dihydroxy-4-androstene-3-one,
2α-fluoro-11β,17β-dihydroxy-4-androsten-3-one, and
6α-methyl-11β,17β-dihydroxy-4-androsten-3-one are hydrogenated to 17β-hydroxy-5α-androstane-3,11-dione,
2α-fluoro-17β-hydroxy-5α-androstane-3,11-dione,
6α-methyl-17β-hydroxy-5α-androstane-3,11-dione,
11β,17β-dihydroxy-5α-androstan-3-one,
2α-fluoro-11β,17β-dihydroxy-5α-androstan-3-one, and
6α-methyl-11β,17β-dihydroxy-5α-androstan-3-one, respectively.

PREPARATION 4

*2α-Fluoro-17β-Hydroxy-5α-Androstan-3-One 17-Acetate*

A mixture of 3 g. of 2α-fluoro-17β-hydroxy-5α-androstan-3-one, 20 ml. of dry pyridine and 15 ml. of acetic anhydride is maintained at a temperature of about 26° C. for 22 hours. The mixture is then poured into 250 ml. of water and stirred for 2 hours at about 26° C. The precipitated 2α-fluoro-17β-hydroxy-5α-androstan-3-one 17-acetate is separated by filtration, washed with water, and dried.

Similarly,

6α-methyl-17β-hydroxy-5α-androstan-3-one,
17β-hydroxy-5α-androstane-3,11-dione,
2α-fluoro-17β-hydroxy-5α-androstane-3,11-dione,
6α-methyl-17β-hydroxy-5α-androstane-3,11-dione,
11β,17β-dihydroxy-5α-androstan-3-one,
2α-fluoro-11β,17β-dihydroxy-5α-androstan-3-one, and
6α-methyl-11β,17β-dihydroxy-5α-androstan - 3 - one are converted by acetylation of the 17β-hydroxy group to
6α-methyl-17β-hydroxy-5α-androstan-3-one 17-acetate,
17β-hydroxy-5α-androstane-3,11-dione 17-acetate,
2α-fluoro-17β-hydroxy-5α-androstane-3,11-dione 17-acetate,
6α-methyl-17β-hydroxy-5α-androstane-3,11-dione 17-acetate,
11β,17β-dihydroxy-5α-androstan-3-one 17-acetate,
2α-fluoro-11β,17β-dihydroxy-5α-androstan-3-one 17-acetate, and
6α-methyl-11β,17β-dihydroxy-5α-androstan-3-one 17-acetate, respectively.

Similarly,

2α-fluoro-17β-hydroxy-5α-androstan-3-one,
6α-methyl-17β-hydroxy-5α-androstan-3-one,
17β-hydroxy-5α-androstane-3,11-dione,
2α-fluoro-17β-hydroxy-5α-androstane-3,11-dione,
6α-methyl-17β-hydroxy-5α-androstane-3,11-dione,
11β,17β-dihydroxy-5α-androstan-3-one,
2α-fluoro-11β,17β-dihydroxy-5α-androstan-3-one, and
6α-methyl-11β,17β-dihydroxy-5α-androstan-3-one are converted to other corresponding 17-acylates by esterification of the 17β-hydroxy group, e.g., by reaction with the appropriate acid anhydride, acid chloride or bromide, acid in the presence of an esterification catalyst, etc., wherein the acyl group is the acyl radical of, for example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexane-carboxylic, cyclohexylacetic, an alkaryl acid, e.g., benzoic, phenylacetic, β-phenylpropionic, o-, m-, p-toluic, a saturated dibasic acid (which can be converted into water-soluble, e.g., sodium, salts), e.g., succinic, adipic, a monobasic unsaturated acid, e.g., acrylic, crotonic, undecylenic, propiolic, undecolic, cinnamic, dibasic unsaturated acids (which can be converted into water-soluble, e.g., sodium, salts), e.g., maleic and citraconic.

EXAMPLE 1

(Reaction 1.)—2α-Fluoro-3α,17β-Dihydroxy-5α-Androstane 17-Acetate (IIα) and 2α-Fluoro-3β,17β-Dihydroxy-5α-Androstane 17-Acetate (IIβ)

To 14 g. of lithium aluminum tri-t-butoxide hydride suspended in 125 ml. of tetrahydrofuran there was added 7.0 g. (20 mmoles) of 2α-fluoro-17β-hydroxy-5α-androstan-3-one 17-acetate at room temperature. The reaction mixture was stirred for three-fourths of an hour. The excess reducing agent was then destroyed by the addition of 20 ml. of 3 N hydrochloric acid in 150 ml. of water. The volatile solvent was removed under reduced pressure and the acidified suspension remaining was extracted with several portions of methylene chloride. The methylene chloride extracts were combined, washed consecutively with water, sodium bicarbonate solution, sodium chloride solution, dried over anhydrous sodium sulfate, and the methylene chloride was distilled in vacuo to give a residue. The residue was dissolved in 25 ml. of methylene chloride and poured onto a 250 g. Florisil (synthetic magnesium silicate) chromatographic column packed wet with commercial hexanes. The column was developed by eluting over a gradient of from 2 to 10% acetone in commercial hexanes while collecting 25 400-ml. fractions. The eluate fractions were freed of solvent. Those fractions which thin-layer chromatography showed to contain the 3α-hydroxy isomer (the less polar material) were combined and recrystallized from acetone to give 2α-fluoro-3α,17β-dihydroxy-5α-androstane 17-acetate (IIα) melting at 209–211° C. (with decomposition). Recrystallization of a portion of this material from acetone gave an analytical sample of 2α-fluoro-3α,17β-dihydroxy-5α-androstane 17-acetate (IIα) having a melting point of 209–211° C. (with decomposition), infrared absorption bands (Nujol) at 3460, 1712 and 1265 cm.$^{-1}$ and the following analysis:

Analysis.—Calcd. for $C_{21}H_{33}O_3F$: C, 71.55; H, 9.44; F, 5.34. Found: C, 71.62; H, 9.25; F, 5.36.

Those fractions which thin-layer chromatography showed to contain the 3β-hydroxy isomer were combined and recrystallized from acetone to give 2α-fluoro-3β,17β-dihydroxy-5α-androstane 17-acetate (IIβ) melting at 166.0–167.0° C. Recrystallization of a portion of this material from acetone gave an analytical sample of 2α-fluoro-3β,17β-dihydroxy-5α-androstane 17-acetate (IIβ) having a melting point of 166.0–167.0° C., infrared absorption bands (Nujol) at 3440, 1720 and 1258 cm.$^{-1}$ and the following analysis:

Analysis.—Calcd. for $C_{21}H_{33}O_3F$: C, 71.55; H, 9.44; F, 5.39. Found: C, 71.71; H, 9.40; F, 5.28.

Similarly substituting a stoichiometric equivalent amount of

4α-methyl-17β-hydroxy-5α-androstan-3-one 17 acetate,
6α-methyl-17β-hydroxy-5α-androstan-3-one 17-acetate,
17β-hydroxy-5α-androstane-3,11-dione 17-acetate,
2α-fluoro-17β-hydroxy-5α-androstane-3,11-dione 17-acetate,
6α-methyl-17β-hydroxy-5α-androstane-3,11-dione 17-acetate,
11β,17β-dihydroxy-5α-androstan-3-one 17-acetate,
2α-fluoro-11β,17β-dihydroxy-5α-androstan-3-one 17-acetate, and
6α-methyl-11β,17β-dihydroxy-5α-androstan-3-one 17-acetate, for 2α-fluoro-17β-hydroxy-5α-androstan-3-one 17 acetate is productive of 4α-methyl-3α,17β-dihydroxy-5α-androstane 17-acetate and
4α-methyl-3β,17β-dihydroxy-5α-androstane 17-acetate,
6α-methyl-3α,17β-dihydroxy-5α-androstane 17-acetate and
6α-methyl-3β,17β-dihydroxy-5α-androstane 17-acetate,
3α,17β-dihydroxy-5α-androstan-11-one 17-acetate and
3β,17β-dihydroxy-5α-androstan-11-one 17-acetate,
2α-fluoro-3α,17β,dihydroxy-5α-androstan-11-one 17-acetate and
2α-fluoro-3β,17β-dihydroxy-5α-androstan-11-one 17-acetate,
6α-methyl-3α,17β-dihydroxy-5α-androstan-11-one 17-acetate and
6α-methyl-3β,17β-dihydroxy-5α-androstane-11-one 17-acetate,
3α,11β,17β-trihydroxy-5α-andronstane 17-acetate and
3β,11β17β-trihydroxy-5α-androstane 17-acetate,
2α-fluoro-3α,11β,17β-trihydroxy-5α-androstane 17-acetate and
2α-fluoro-3β,11β,17β-trihydroxy-5α-androstane 17-acetate, and
6α-methyl-3α,11β,17β-trihydroxy-5α-androstane 17-acetate and
6α-methyl-3β,11β,17β-trihydroxy-5α-androstane 17-acetate, respectively.

EXAMPLE 2

(Reaction 2).—2α-Fluoro - 3α,17β-Dihydroxy-5α-Androstane 3-Dihydropyranyl Ether 17-Acetate (III)

To 1.8 g. of 2α-fluoro-3α,17β-hydroxy-5α-androstane 17-acetate (IIα), obtained according to the procedure of Example 1, suspended in 10 ml. of dihydropyran and 50 ml. of ether there was added 100 mg. of p-toluenesulfonic acid. The ether solution was stirred overnight, extracted consecutively with sodium bicarbonate solution, saturated sodium chloride solution, dried over anhydrous sodium sulfate and taken to dryness under reduced pressure to give a light yellow crystalline residue comprising 2α-fluoro-3α, 17β-dihydroxy-5α-androstane 3-dihydropyranyl ether 17-acetate (III) having infrared absorption bands (Nujol) at 1732 and 1245 cm.$^{-1}$. This residue was used in the following example without further purification.

Similarly substituting a stoichiometric equivalent amount of

4α-methyl-3α,17β-dihydroxy-5α-androstane 17-acetate,
6α-methyl-3α,17β-dihydroxy-5α-androstane 17-acetate,
3α,17β-dihydroxy-5α-androstan-11-one 17-acetate,
2α-fluoro-3α,17β-dihydroxy-5α-androstan-11-one 17-acetate,
6α-methyl-3α,17β-dihydroxy-5α-androstan-11-one 17-acetate,
3α,11β,17β-trihydroxy-5α-androstane 17-acetate,
2α-fluoro-3α,11β,17β-trihydroxy-5α-androstane 17-acetate, and
6α-methyl-3α,11β,17β-trihydroxy-5α-androstane 17 - acetate, obtained according to the procedure of Example 1, for 2α-fluoro-3α,17β-dihydroxy-5α-androstane 17-acetate is productive of residues comprising 4α-methyl-3α,17β-dihydroxy-5α-androstane 3 - dihydropyranyl ether 17-acetate,
6α-methyl-3α,17β-dihydroxy-5α-androstane 3-dihydropyranyl ether 17-acetate,
3α,17β-dihydroxy-5α-androstan-11-one 3-dihydropyranyl ether 17-acetate,
2α-fluoro-3α,17β-dihydroxy-5α-androstan-11-one 3-dihydropyranyl ether 17-acetate,
6α-methyl-3α,17β-dihydroxy-5α-androstan-11-one 3-dihydropyranyl ether 17-acetate,
3α,11β,17β-trihydroxy-5α-androstane 3-dihydropyranyl ether 17-acetate,
2α-fluoro-3α,11β,17β-trihydroxy-5α-androstane 3-dihydropyranyl ether 17-acetate, and 6α-methyl-3α,11β,17β-trihydroxy-5α-androstane 3-dihydropyranyl ether 17-acetate, respectively.

EXAMPLE 3

*(Reaction 3).—2α-Fluoro-3α,17β-Dihydroxy-5α-Androstane 3-Dihydropyranyl Ether (IV)*

The light yellow crystalline residue comprising 2α-fluoro-3α·17β-dihydroxy-5α-androstane 3 - dihydropyranyl ether 17-acetate (III), obtained in Example 2, was dissolved in 100 ml. of 5% potassium carbonate in methanol-water (4:1) solution and the reaction mixture was heated to reflux for 1½ hours. The solvents were removed under reduced pressure to give 2.5 g. of a crystalline tan residue comprising 2α-fluoro-3α,17β-dihydroxy-5α-androstane 3-dihydropyranyl ether (IV) which was used in the following example without further purification.

Similarly substituting the residues comprising

4α-methyl-3α,17β-dihydroxy-5α-androstane 3-dihydropyranyl ether 17-acetate,
6α-methyl-3α,17β-dihydroxy-5α-androstane 3-dihydropyranyl ether 17-acetate,
3α,17β-dihydroxy-5α-androstan-11-one 3-dihydropyranyl ether 17-acetate,
2α-fluoro-3α,17β-dihydroxy-5α-androstan-11-one 3-dihydropyranyl ether 17-acetate,
6α-methyl-3α,17β-dihydroxy-5α-androstan-11-one 3-dihydropyranyl ether 17-acetate,
3α,11β,17β-trihydroxy-5α-androstane 3-dihydropyranyl ether 17-acetate,
2α-fluoro-3α,11β,17β-trihydroxy-5α - androstane 3-dihydropyranyl ether 17-acetate, and
6α-methyl-3α,11β,17β-trihydroxy-5α-androstane 3-dihydropyranyl ether 17-acetate, obtained according to the procedure of Example 2, for the residue comprising
2α-fluoro-3α,17α-dihydroxy-5α-androstane 3-dihydropyranyl ether 17-acetate is productive of residues comprising 4α-methyl-3α,17β-dihydroxy-5α-androstane 3-dihydropyranyl ether,
6α-methyl-3α,17β-dihydroxy-5α-androstane 3-dihydropyranyl ether,
3α,17β-dihydroxy-5α-androstan-11-one 3-dihydropyranyl ether,
2α-fluoro-3α,17β-dihydroxy-5α-androstan-11-one 3-dihydropyranyl ether,
6α-methyl-3α,17β-dihydroxy-5α-androstan-11-one 3-dihydropyranyl ether,
3α11β,17β-trihydroxy-5α-androstane 3-dihydropyranyl ether,
2α-fluoro-3α,11β,17β-trihydroxy-5α-androstane 3-dihydropyranyl ether, and
6α-methyl-3α,11β,17β-trihydroxy-5α-androstane 3-dihydropyranyl ether, respectively.

EXAMPLE 4

*(Reaction 4).—2α-Fluoro-3α-Hydroxy-5α-Androstan-17-One 3-Dihydropyranyl Ether (V)*

The 2.5 g. of crystalline tan solid comprising 2α-fluoro-3α,17β-dihydroxy-5α-androstane 3-dihydropyranyl ether (IV), obtained in Example 3, was taken up in 10 ml. of pyridine and added to a pyridine-chromic acid complex prepared from 2 g. of chromic anhydride in 20 ml. of pyridine. The reaction mixture was stirred for five hours at room temperature, diluted with ether-benzene (1:1) and filtered on a Celite (diatomaceous earth) pad. The filtrate was washed consecutively with water and saturated sodium chloride solution, dried over anhydrous sodium sulfate and taken to dryness under reduced pressure and the residual pyridine was distilled azeotropically with toluene under reduced pressure to yield a light brown residue comprising 2α-fluoro-3α-hydroxy-5α-androstan-17-one 3-dihydropyranyl ether (V) which was used in the following example without further purification.

Similarly substituting the residues comprising

4α-methyl-3α,17β-dihydroxy-5α-androstane 3-dihydropyranyl ether,
6α-methyl-3α,17β-dihydroxy-5α-androstan 3-dihydropyranyl ether,
3α,17β-dihydroxy-5α-androstan-11-one 3-dihydropyranyl ether,
2α-fluoro-3α,17β-dihydroxy-5α-androstan-11-one 3-dihydropyranyl ether, and
6α-methyl-3α,17β-dihydroxy-5α-androstan-11-one 3-dihydropyranyl ether, obtained according to the procedure of Example 3, for the residue comprising
2α-fluoro-3α,17β-dihydroxy-5α-androstane 3-dihydropyranyl ether is productive of residues comprising
4α-methyl-3α-hydroxy-5α-androstan-17-one 3-dihydropyranyl ether,
6α-methyl-3α-hydroxy-5α-androstan-17-one 3-dihydropyranyl ether,
3α-hydroxy-5α-androstane-11,17-dione 3-dihydropyranyl ether,
2α-fluoro-3α-hydroxy-5α-androstane-11,17-dione 3-dihydropyranyl ether, and
6α-methyl-3α-hydroxy-5α-androstane-11,17-dione 3-dihydropyranyl ether, respectively.

EXAMPLE 5

*(Reaction 5).—2α-Fluoro-3α-Hydroxy-5α-Androstan-17-One (VI)*

The light brown residue comprising 2α-fluoro-3α-hydroxy-5α-androstan-17-one 3-dihydropyranyl ether (V), obtained in Example 4, was taken up in 20 ml. of acetone and 2 ml. of 3 N hydrochloric acid was added thereto. The reaction mixture, after standing at room temperature overnight, yielded a first crop of colorless crystals weighing 440 mg. and having a melting point of 217–217.5° C. (with decomposition). Dilution of the filtrate with water yielded a second crop of colorless crystals weighing 630 mg. and having a melting point of 215–215.5° C. (with decomposition). The first and second crops were combined and a portion recrystallized from acetone to yield an analytical sample of 2α-fluoro-3α-hydroxy-5α-androstan-17-one (VI) having a melting point of 219–219.5° C. (with decomposition), infrared absorption bands (Nujol) at 3480 and 1725 cm.$^{-1}$ and the following analysis:

*Analysis.*—Calcd. for $C_{19}H_{29}O_2F$: C, 74.22; H, 9.18; F, 6.18. Found: C, 73.91; H, 9.27; F, 6.13.

Similarly substituting the residues comprising

4α-methyl-3α-hydroxy-5α-androstan-17-one 3-dihydropyranyl ether,
6α-methyl-3α-hydroxy-5α-androstan-17-one 3-dihydropyranyl ether,
3α-hydroxy-5α-androstane-11,17-dione 3-dihydropyranyl ether,
2α-fluoro-3α-hydroxy-5α-androstane-11,17-dione 3-dihydropyranyl ether, and
6α-methyl-3α-hydroxy-5α-androstane-11,17-dione 3 - dihydropyranyl ether, obtained according to the procedure of Example 4, for the residue comprising 2α-fluoro-3α-hydroxy-5α-androstan-17-one 3-dihydropyranyl ether is productive of
4α-methyl-3α-hydroxy-5α-androstan-17-one,
6α-methyl-3α-hydroxy-5α-androstan-17-one,
3α-hydroxy-5α-androstane-11,17-dione,
2α-fluoro-3α-hydroxy-5α-androstane-11,17-dione, and
6α-methyl-3α-hydroxy-5α-androstane-11,17-dione, respectively.

EXAMPLE 6

*(Reaction 6).—2α-Fluoro-3α-Hydroxy-5α-Androstane-11,17-Dione 17-Ethylene Ketal (VII)*

1 g. of 2α-fluoro-3α-hydroxy-5α-androstane-11,17-dione (VI), obtained according to the procedure of Example 5, is dissolved in a mixture of 50 ml. of benzene and 5 ml. of ethylene glycol containing 100 mg. of p-toluenesulfonic acid. The reaction mixture is refluxed overnight, during which time water is collected in a Dean-Stark water trap. After cooling the reaction mixture is washed consecutively with water, 4% sodium bicarbonate solution and saturated sodium chloride solution, dried over anhydrous sodium sulfate and taken to dryness under reduced pressure to give a residue comprising 2α-fluoro-3α-hydroxy-5α-androstane-11,17-dione 17-ethylene ketal (VII)

which is used in the following example without further purification.

Similarly substituting a stoichiometric equivalent amount of

2α-fluoro-3α-hydroxy-5α-androstan-17-one,
4α-methyl-3α-hydroxy-5α-androstan-17-one,
6α-methyl-3α-hydroxy-5α-androstan-17-one,
3α-hydroxy-5α-androstane-11,17-dione, and
6α-methyl-3α-hydroxy-5α - androstane - 11,17 - dione, obtained according to the procedure of Example 5, for 2α-fluoro-3α-hydroxy-5α-androstane-11,17-dione is productive of residues comprising 2α-fluoro-3α-hydroxy-5α-androstan-17-one 17-ethylene ketal,
4α-methyl-3α-hydroxy-5α-androstan-17-one 17-ethylene ketal,
6α-methyl-3α-hydroxy-5α-androstan-17-one 17-ethylene ketal,
3α-hydroxy-5α-androstane-11,17-dione 17-ethylene ketal, and
6α-methyl-3α-hydroxy-5α-androstane-11,17-dione 17-ethylene ketal, respectively.

EXAMPLE 7

(Reaction 7).—2α-Fluoro-3α,11β-Dihydroxy-5α-Androstan-17-One 17-Ethylene Ketal (VIII)

The residue comprising 2α-fluoro-3α-hydroxy-5α-androstane-11,17-dione 17-ethylene ketal (VII), obtained in Example 6, is added to a solution of 100 mg. of lithium aluminum hydride in 25 ml. of tetrahydrofuran and the reaction is allowed to proceed at reflux for one hour. The reaction mixture is chilled and the excess lithium aluminum hydride is destroyed by the addition of 1 ml. of ethyl acetate, followed by 0.5 ml. of water. The thus obtained mixture is then filtered and the filtrate taken to dryness under reduced pressure to yield a residue comprising 2α-fluoro-3α,11β-dihydroxy-5α-androstan-17 - one 17-ethylene ketal (VIII) which is used in the following example without further purification.

Similarly substituting the residues comprising

3α-hydroxy-5α-androstane-11,17-dione 17-ethylene ketal, and
6α-methyl-3α-hydroxy-5α-androstane-11,17-dione 17-ethylene ketal, obtained according to the procedure of Example 6, for the residue comprising
2α-fluoro-3α-hydroxy-5α-androstane-11,17-dione is productive of residues comprising
3α,11β-dihydroxy-5α-androstan-17-one 17-ethylene ketal, and
6α-methyl-3α,11β-dihydroxy-5α-androstan-17-one 17-ethylene ketal, respectively.

EXAMPLE 8

(Reaction 8).—2α-Fluoro-3α,11β-Dihydroxy-5α-Androstan-17-One (IX)

The residue comprising 2α-fluoro-3α,11β-dihydroxy-5α-androstan-17-one 17-ethylene ketal (VIII), obtained in Example 7, is dissolved in 6.5 ml. of acetic acid to which is added 3.5 ml. of water. The reaction mixture, after standing overnight at room temperature, is diluted with 4% sodium bicarbonate until crystallization takes place. The crystalline material comprising 2α-fluoro-3α,11β-dihydroxy-5α-androstan-17-one is isolated, washed thoroughly with water and taken up in methylene chloride. The thus obtained methylene chloride solution is poured onto a 75 g. Florisil chromatographic column packed wet with commercial hexanes. The column is developed by eluting over a gradient of from 5 to 20% acetone in commercial hexanes while collecting 100-ml. fractions. The eluate fractions are freed of solvent. Those fractions which thin-layer chromatography show to contain the desired product are combined and recrystallized from alcohol-water to yield 2α-fluoro-3α,11β-dihydroxy-5α-androstan-17-one (IX).

Similarly substituting the residues comprising

3α,11β-dihydroxy-5α-androstan-17-one 17-ethylene ketal, and
6α-methyl-3α,11β-dihydroxy-5α-androstan-17-one 17-ethylene ketal, obtained according to the procedure of Example 7, for the residue comprising
2α-fluoro-3α,11β-dihydroxy-5α-androstan-17-one 17-ethylene ketal is productive of
3α,11β-dihydroxy-5α-androstan-17-one, and
6α-methyl-3α,11β-dihydroxy-5α-androstan-17-one, respectively.

EXAMPLE 9

(Reaction 9).—2α-Fluoro-3β,17β-Dihydroxy-5α-Androstane 3-p-Tosylate 17-Acetate (X)

To 1.83 g. of 2α-fluoro-3β,17β-dihydroxy-5α-androstane 17-acetate (IIβ), obtained according to the procedure of Example 1, dissolved in 15 ml. of pyridine there was added 1.83 g. of p-toluenesulfonyl chloride. The reaction mixture was allowed to stand at room temperature overnight, following which the solution was poured into 250 ml. of 3 N hydrochloric acid and cooled at 4° C. for 10 hours during which time a precipitate formed. The supernatant liquid was decanted from the precipitate and the latter was dissolved in 50 ml. of methylene chloride. The thus obtained solution was washed consecutively with dilute hydrochloric acid and saturated sodium chloride solution, dried over anhydrous sodium sulfate and taken to dryness under reduced pressure to give a residue which was recrystallized from methanol in two crops. The two crops were combined to give 1.8 g. of 2α-fluoro-3β,17β-dihydroxy-5α-androstane 3-p-tosylate 17-acetate (X) having a melting point of 133–134.5° C. A portion was recrystallized twice from methanol to yield an analytical sample of 2α-fluoro-3β,17β-dihydroxy-5α-androstane 3-p-tosylate 17-acetate having a melting point of 136.5–137.5° C., infrared absorption bands (Nujol) at 1740, 1601, 1494 and 1315 cm.$^{-1}$ and the following analysis:

Analysis.—Calcd. for $C_{28}H_{39}O_5SF$: C, 66.37; H, 7.75; S, 6.32; F, 3.74. Found: C, 66.16; H, 8.03; S, 6.30; F, 3.48.

Similarly substituting a stoichiometric equivalent amount of

4α-methyl-3β,17β-dihydroxy-5α-androstane 17-acetate,
6α-methyl-3β,17β-dihydroxy-5α-androstane 17-acetate,
3β,17β-dihydroxy-5α-androstan-11-one 17-acetate,
2α-fluoro-3β,17β-dihydroxy-5α-androstan-11-one 17-acetate,
6α-methyl-3β,17β-dihydroxy-5α-androstan-11-one 17-acetate,
3β,11β,17β-trihydroxy-5α-androstane 17-acetate,
2α-fluoro-3β,11β,17β-trihydroxy-5α-androstane 17-acetate, and
6α-methyl-3β,11β,17β-trihydroxy-5α-androstane 17 - acetate, obtained according to the procedure of Example 1, for 2α-fluoro-3β,17β-dihydroxy-5α-androstane 17-acetate is productive of 4α-methyl-3β,17β-dihydroxy-5α-androstane 3-p-tosylate 17-acetate,
6α-methyl-3β,17β-dihydroxy-5α-androstane 3-p-tosylate 17-acetate,
3β,17β-dihydroxy-5α-androstan-11-one 3-p-tosylate 17-acetate,
2α-fluoro-3β,17β-dihydroxy-5α-androstan-11-one 3-p-tosylate 17-acetate, 6α-methyl-3β,17β-dihydroxy-5α-androstan-11-one 3-p-tosylate 17-acetate,
3β,11β,17β-trihydroxy-5α-androstane 3-p-tosylate 17-acetate,
2α-fluoro-3β,11β,17β-trihydroxy-5α-androstane 3-p-tosylate 17-acetate, and
6α-methyl-3β,11β,17β-trihydroxy-5α-androstane 3-p-tosylate 17-acetate, respectively.

EXAMPLE 10

(Reaction 10).—2α-Fluoro-3β,17β-Dihydroxy-5α-Androstane 3-p-Tosylate (XI)

To 1.52 g. of 2α-fluoro-3β,17β-dihydroxy-5α-androstane 3-p-tosylate 17-acetate (X), obtained in Example 9, dissolved in 50 ml. of warm methanol there was added 1 ml. of concentrated hydrochloric acid. The reaction mixture was allowed to come to room temperature overnight, diluted with 50 ml. of water, followed by removal of the alcohol under reduced pressure to yield a residue. The residue was extracted with several portions of ether and the combined ether extracts were washed consecutively with water and saturated sodium chloride solution, dried over anhydrous sodium sulfate and taken to dryness under reduced pressure to give a colorless glass residue comprising 2α-fluoro-3β,17β-dihydroxy-5α-androstane 3-p-tosylate (XI). A portion of the glass was recrystallized from methanol to yield 2α-fluoro-3β,17β-dihydroxy-5α-androstane 3-p-tosylate having a melting point of 93.5–100° C.

Similarly substituting a stoichiometric equivalent amount of

4α-methyl-3β,17β-dihydroxy-5α-androstane 3-p-tosylate 17-acetate,
6α-methyl-3β,17β-dihydroxy-5α-androstane 3-p-tosylate 17-acetate,
3β,17β-dihydroxy-5α-androstan-11-one 3-p-tosylate 17-acetate,
2α-fluoro-3β,17β-dihydroxy-5α-androstan-11-one 3-p-tosylate 17-acetate,
6α-methyl-3β,17β-dihydroxy-5α-androstan-11-one 3-p-tosylate 17-acetate,
3β,11β,17β-trihydroxy-5α-androstane 3-p-tosylate 17-acetate,
2α-fluoro-3β,11β,17β-trihydroxy-5α-androstane 3-p-tosylate 17-acetate, and
6α-methyl-3β,11β,17β-trihydroxy-5α-androstane 3-p-tosylate 17-acetate, obtained according to the procedure of Example 9, for 2α-fluoro-3β,17β-dihydroxy-5α-androtsane-3-p-tosylate 17-acetate, is productive of residues comprising 4α-methyl-3β,17β-dihydroxy-5α-androstane 3-p-tosylate,
6α-methyl-3β,17β-dihydroxy-5α-androstane 3-p-tosylate,
3β,17β-dihydroxy-5α-androstan-11-one 3-p-tosylate,
2α-fluoro-3β,17β-dihydroxy-5α-androstan-11-one 3-p-tosylate,
6α-methyl-3β,17β-dihydroxy-5α-androstan-11-one 3-p-tosylate,
3β,11β,17β-trihydroxy-5α-androstane 3-p-tosylate,
2α-fluoro-3β,11β,17β-trihydroxy-5α-androstane 3-p-tosylate, and
6α-methyl-3β,11β,17β-trihydroxy-5α-androstane 3-p-tosylate, respectively.

EXAMPLE 11

(Reaction 11).—2α-Fluoro-3β-Hydroxy-5α-Androstan-17-one 3-p-Tosylate (XII)

The glass comprising 2α-fluoro-3β,17β-dihydroxy-5α-androstane 3-p-tosylate (XI), obtained in Example 10, was taken up in 15 ml. of pyridine and added to a pyridine-chromic acid complex prepared from 1.5 g. of chromic anhydride in 15 ml. of pyridine. The reaction mixture was stirred for 5 hours at room temperature, diluted with ether-benzene (1:1) and filtered on a Celite pad. The filtrate was washed consecutively with water and saturated sodium chloride solution, dried over anhydrous sodium sulfate and taken to dryness under reduced pressure and the residual pyridine was distilled azeotropically with toluene under reduced pressure to yield a white crystalline solid which upon recrystallization from methanol yielded 1.1 g. of 2α-fluoro-3β-hydroxy-5α-androstan-17-one 3-p-tosylate (XII) having a melting point of 201–202.5° C. A portion was again recrystallized from methanol to yield an analytical sample of 2α-fluoro-3β-hydroxy-5α-androstan-17-one 3-p-tosylate having a melting point of 202–203.5° C., infrared absorption bands (Nujol) at 1730, 1596, 1491 and 1359 cm.$^{-1}$ and the following analysis:

Analysis.—Calcd. for $C_{26}H_{35}O_4FS$: C, 67.50; H, 7.63; S, 6.93. Found: C, 67.82; H, 7.90; S, 7.26.

Similarly substituting the residues comprising

4α-methyl-3β,17β-dihydroxy-5α-androstane 3-p-tosylate,
6α-methyl-3β,17β-dihydroxy-5α-androstane 3-p-tosylate,
3β,17β-dihydroxy-5α-androstan-11-one-3-p-tosylate,
2α-fluoro-3β,17β-dihydroxy-5α-androstan-11-one 3-p-tosylate, and
6α-methyl-3β,17β-dihydroxy - 5α - androstan-11-one 3-p-tosylate, obtained according to the procedure of Example 10, for the residue comprising 2α-fluoro-3β,17β-dihydroxy-5α-androstane 3-p-tosylate is productive of 4α-methyl-3β-hydroxy-5α-androstan-17-one 3-p-tosylate,
6α-methyl-3β-hydroxy-5α-androstan-17-one 3-p-tosylate,
3β-hydroxy-5α-androstane-11,17-dione 3-p-tosylate,
2α fluoro-3β-hydroxy-5α-androstane-11,17-dione 3-p-tosylate, and
6α-methyl-3β-hydroxy-5α-androstane-11,17-dione 3-p-tosylate, respectively.

EXAMPLE 12

(Reaction 12).—2-Fluoro-5α-Androst-2-en-17-one (XIII) and 2α-Fluoro-3α-Hydroxy-5α-Androstan-17-One 3-Formate (XIV)

0.96 g. of 2α-fluoro-3β-hydroxy-5α-androstan-17-one 3-p-tosylate, obtained in Example 11, in 25 ml. of dimethylformamide containing 1.0 g. of sodium formate was placed in a sealed tube and heated to 220° C. overnight. Following the cooling of the sealed tube to room temperature it was opened and the reaction mixture contained therein poured into 300 ml. of water to give a solid and a liquid phase. The solid phase was collected on a funnel, washed with water and dried in vacuo at 60° C. to yield a residue comprising 2-fluoro-5α-androst-2-en-17-one (XIII) and 2α-fluoro-3α-hydroxy-5α-androstan-17-one 3-formate (XIV) which was used in the following example without further purification.

Similarly substituting a stoichiometric equivalent amount of

4α-methyl-3β-hydroxy-5α-androstan-17-one 3-p-tosylate,
6α-methyl-3β-hydroxy-5α-androstan-17-one 3-p-tosylate,
3β-hydroxy-5α-androstant-11,17-dione 3-p-tosylate,
2α-fluoro-3β-hydroxy-5α-androstane-11,17-dione 3-p-tosylate, and
6α-methyl-3β-hydroxy-5α-androstane - 11,17 - dione 3 - p-tosylate, obtained according to the procedure of Example 11, for 2α-fluoro-3β-hydroxy-5α-androstan-17-one 3-tosylate is productive of residues comprising
4α-methyl-5α-androst-2-en-17-one and
4α-methyl-3α-hydroxy-5α-androstan-17-one 3-formate,
6α-methyl-5α-androst-2-en-17-one and
6α-methyl-3α-hydroxy-5α-androstan-17-one 3-formate,
5α-androst-2-ene-11,17-dione and
3α-hydroxy-5α-androstane-11,17-dione 3-formate,
2α-fluoro-5α-androst-2-ene-11,17-dione and
2α-fluoro-3α-hydroxy-5α-androstane-11,17-dione 3-formate, and
6α-methyl-5α-androst-2-ene-11,17-dione and
6α-methyl-3α-hydroxy-5α-androstane-11,17-dione 3-formate, respectively.

EXAMPLE 13

(Reaction 13).—2-Fluoro-5α-Androst-2-en-17-one (XIII) and 2α-Fluoro-3α-Hydroxy-5α-Androstan-17-one (VI)

The residue comprising 2-fluoro-5α-androst-2-en-17-one (XIII) and 2α-fluoro-3α-hydroxy-5α-androstan-17-one 3-formate (XIV), obtained in Example 12, was dissolved in benzene and poured onto a 100 g. Fisher A–540 alumina chromatographic column made up with benzene. The column was developed by eluting over a gradient of 0 to 5% methanol in benzene during 30 50-ml. fractions. The eluate fractions were freed of solvent. Those fractions which thin-layer chromatography showed to contain the 3α-hydroxy compound were combined to give 523 mg. of solid material which upon recrystallization from acetone yielded 280 mg. of 2α-fluoro-3α-hydroxy-5α-androstan-17-one (VI) having a melting point of 210–214° C. (with decomposition). The thus obtained 2α-fluoro-3α-hydroxy-5α-androstan-17-one had an infrared analysis which was identical with that obtained for the product of Example 5 and did not depress the melting point on admixture with the product obtained in Example 5.

Those fractions which thin-layer chromatography show to contain the $\Delta^2$ compound are combined and recrystallized from alcohol-water to yield 2-fluoro-5α-androst-2-en-17-one.

Similarly substituting the residues comprising
4α-methyl-5α-androst-2-en-17-one and
4α-methyl-3α-hydroxy-5α-androstan-17-one 3-formate,
6α-methyl-5α-androst-2-en-17-one and
6α-methyl-3α-hydroxy-5α-androstan-17-one 3-formate,
5α-androst-2-ene-11,17-dione and
3α-hydroxy-5α-androstane-11,17-dione 3-formate,
2α-fluoro-5α-androst-2-ene-11,17-dione and
2α-fluoro-3α-hydroxy-5α-androstane-11,17-dione 3-formate, and
6α-methyl-5α-androst-2-ene-11,17-dione and
6α-methyl-3α-hydroxy-5α-androstane-11,17 - dione 3 - formate, obtained according to the procedure of Example 12, for the residue comprising 2α-fluoro-5α-androst-2-en-17-one and 2α-fluoro-3α-hydroxy-5α-androstan-17-one 3-formate is productive of
4α-methyl-5α-androst-2-en-17-one and
4α-methyl-3α-hydroxy-5α-androstan-17-one,
6α-methyl-5α-androst-2-en-17-one and
6α-methyl-3α-hydroxy-5α-androstan-17-one,
5α-androst-2-ene-11,17-dione and
3α-hydroxy-5α-androstane-11,17-dione,
2α-fluoro-5α-androst-2-ene-11,17-dione and
2α-fluoro-3α-hydroxy-5α-androstane-11,17-dione, and
6α-methyl-5α-androst-2-ene-11,17-dione and
6α-methyl-3α-hydroxy-5α-androstane-11,17-dione (respectively.

EXAMPLE 14

(Reaction 14).—2α-Fluoro-3α,17β-Dihydroxy-5α-Androstane (XVα)

70 mg. of 2α-fluoro-3α,17β-dihydroxy-5α-androstane 17-acetate (IIα), obtained according to the procedure of Example 1, was dissolved with warming in 3 ml. of 5% potassium hydroxide in methanol, followed by the addition of three drops of water. After standing overnight at room temperature the solution was warmed on a steam bath and diluted to incipient crystallization by the dropwise addition of water. Upon cooling colorless prisms crystallized and they were isolated by filtration and air dried to give 49.0 mg. of 2α-fluoro-3α,17β-dihydroxy-5α-androstane (XVα) having a melting point of 209.5–211.0° C. Recrystallization of a portion of this material from alcohol-water gave an analytical sample of 2α-fluoro-3α,17β-dihydroxy-5α-androstane having a melting point of 209.5–211° C., infrared absorption bands (Nujol) at 3510, 3390, 1135, 1080, 1045 and 1025 cm.$^{-1}$ and the following analysis:

Analysis.—Calcd. for $C_{19}H_{31}O_2F$: F, 6.12. Found: F, 6.15.

Similarly substituting a stoichiometric equivalent amount of

4α-methyl-3α,17β-dihydroxy-5α-androstane 17-acetate,
6α-methyl-3α,17β-dihydroxy-5α-androstane 17-acetate,
3α,17β-dihydroxy-5α-androstan-11-one 17-acetate,
2α-fluoro-3α,17β-dihydroxy-5α-androstan-11-one 17-acetate,
6α-methyl-3α,17β-dihydroxy-5α-androstan-11-one 17-acetate,
3α,11β,17β-trihydroxy-5α-androstane 17-acetate,
2α-fluoro-3α,11β,17β-trihydroxy-5α-androstane 17-acetate, and
6α-methyl-3α,11β,17β-trihydroxy-5α - androstane 17 - acetate, obtained according to the procedure of Example 1, for 2α-fluoro-3α,17β-dihydroxy-5α-androstane 17-acetate is productive of
4α-methyl-3α,17β-dihydroxy-5α-androstane,
6α-methyl-3α,17β-dihydroxy-5α-androstane,
3α,17β-dihydroxy-5α-androstan-11-one,
2α-fluoro-3α,17β-dihydroxy-5α-androstan-11-one,
6α-methyl-3α,17β-dihydroxy-5α-androstan-11-one,
3α,11β,17β-trihydroxy-5α-androstane,
2α-fluoro-3α,11β,17β-trihydroxy-5α-androstane, and
6α-methyl-3α,11β,17β-trihydroxy-5α - androstane, respectively.

EXAMPLE 15

(Reaction 14).—2α-Fluoro-3β,17β-Dihydroxy-5α-Androstane (XVβ)

60 mg. of 2α-fluoro-3β,17β-dihydroxy-5α-androstane 17-acetate (IIβ), obtained according to the procedure of Example 1, was dissolved with warming in 1.5 ml. of 5% potassium hydroxide in methanol, followed by the addition of a drop of water. After standing overnight at room temperature the solution was warmed on a steam bath and diluted to incipient crystallization by the dropwise addition of water. Upon cooling colorless prisms crystallized and they were isolated by filtration and air dried to give 40.0 mg. of 2α-fluoro-3β,17β-dihydroxy-5α-androstane having a melting point of 175.0–176.0° C., infrared absorption bands at 3470, 3180, 1075 and 1050 cm.$^{-1}$ and the following analysis:

Analysis.—Calcd. for $C_{19}H_{31}O_2F$: F, 6.12. Found: F, 5.97.

Similarly substituting a stoichiometric equivalent amount of

4α-methyl-3β,17β-dihydroxy-5α-androstane 17-acetate,
6α-methyl-3β,17β-dihydroxy-5α-androstane 17-acetate,
3β,17β-dihydroxy-5α-androstan-11-one 17-acetate,
2α-fluoro-3β,17β-dihydroxy-5α-androstan-11-one 17-acetate,
6α-methyl-3β,17β-dihydroxy-5α-androstan-11-one 17-acetate,
3β,11β,17β-trihydroxy-5α-androstane 17-acetate,
2α-fluoro-3β,11β,17β-trihydroxy-5α-androstane 17-acetate, and
6α-methyl-3β,11β,17β-trihydroxy-5α-androstane 17-acetate, obtained according to the procedure of Example 1, for 2α-fluoro-3β,17α-dihydroxy-5α-androstane 17-acetate is productive of
4α-methyl-3β,17β-dihydroxy-5α-androstane,
6α-methyl-3β,17β-dihydroxy-5α-androstane,
3β,17β-dihydroxy-5α-androstan-11-one,
2α-fluoro-3β,17β-dihydroxy-5α-androstan-11-one,
6α-methyl-3β,17β-dihydroxy-5α-androstan-11-one,
3β,11β,17β-trihydroxy-5α-androstane,
2α-fluoro-3β,11β,17β-trihydroxy-5α-androstane, and
6α-methyl-3β,11β,17β-trihydroxy-5α-androstane, respectively.

EXAMPLE 16

*(Reaction 12).—5α-Androst-2-Ene-11,17-Dione (XIII) and 3α-Hydroxy-5α-Androstane-11,17-Dione 3-Formate (XIV)*

1.0 g. of 3β-hydroxy-5α-androstane-11,17-dione 3-p-tosylate (XII), obtained acocrding to the procedure of Example 11, was dissolved in 85 ml. of dimethylformamide and the reaction mixture was heated to 80–85° C. for approximately 120 hours. The reaction mixture was poured into 500 ml. of saturated sodium chloride solution and extracted with 3 100-ml. portions of methylene chloride. The methylene chloride extracts were combined and washed consecutively with water (twice) and saturated sodium chloride solution, dried over anhydrous sodium sulfate and taken to dryness under reduced pressure to give a residue comprising 5α-androst-2-ene-11,17-dione (XIII) and 3α-hydroxy-5α-androstane-11,17-dione 3-formate (XIV) which was used in the following example without further purification.

EXAMPLE 17

*(Reaction 13).—5α-Androstat-2-Ene-11,17-Dione (XIII) and 3α-Hydroxy-5α-Androstane-11,17-Dione (VI)*

The residue comprising 5α-androst-2-ene-11,17-dione (XIII) and 3α-hydroxy-5α-androstane-11,17-dione 3-formate (XIV), obtained in Example 16, was dissolved in benzene and poured onto a 50 g. Fisher A–540 alumina chromatographic column. The column was developed by eluting over a gradient of 0 to 5% benzene in methanol while collecting 26 30-ml. fractions. The eluate fractions were freed of solvent. Those fractions which thin-layer chromatography showed to contain the Δ$^2$ compound were combined (3 mg.) to give 5α-androst-2-ene-11,17-dione having infrared absorption bands (Nujol) at 1745, 1705 and 1650 cm.$^{-1}$. A portion was recrystallized from acetone to give an analytical sample of 5α-androst-2-ene-11,17-dione having a melting point of 192–194.5° C.

Those fractions which thin-layer chromatography showed to principally contain the 3α-hydroxy compound were combined, dissolved in 20 ml. of methylene chloride and poured onto a 50 g. Florisil chromatographic column packed wet in commercial hexanes. The column was developed by eluting over a gradient of from 5 to 15% acetone in commercial hexanes while collecting 20 50-ml. fractions. The eluate fractions were freed of solvent. Those fractions which thin-layer chromatography showed to contain the 3α-hydroxy compound were combined and recrystallized from acetone-commercial hexanes to give 500 mg. of 3α-hydroxy-5α-androstane-11,17-dione (VI) melitng at 133–155° C. Four recrystallizations of a portion of this material from acetone-commercial hexanes gave an analytical sample of needles of 3α-hydroxy-5α-androstane-11,17-dione having a melting point of 151.5–155.5° C., infrared absorption bands (Nujol) at 3470, 1730, and 1705 cm.$^{-1}$ and the following analysis:

*Analysis.*—Calcd. for $C_{19}H_{28}O_3$: C, 74.96; H, 9.27. Found: C, 74.68; H, 9.33.

EXAMPLE 18

*(Reaction 6.) — 3α-Hydroxy-5α-Androstane-11,17-Dione 17-Ethylene Ketal (VII)*

2.38 g. of 3α-hydroxy-5α-androstane-11,17-dione (VI), obtained acording to the procedure of Example 18, was dissolved in a mixture of 50 ml. of benzene and 10 ml. of ethylene glycol containing 10 mg. of p-toluenesulfonic acid. The reaction mixture was heated to relux overnight, during which time 0.6 ml. of water collected in the water trap. The reaction mixture was cooled, washed consecutively with water, 4% sodium bicarbonate solution and saturated sodium chloride solution, dried over sodium sulfate and taken to dryness under reduced pressure to give a residue comprising 3α-hydroxy-5α-androstane-11,17-dione 17-ethylene ketal (VII) which was used in the following example without further purification.

EXAMPLE 19

*(Reaction 7). — 3α,11β-Dihydroxy-5α-Androstan-17-One 17-Ethylene Ketal (VIII)*

The residue comprising 3α-hydroxy-5α-androstane-11,17-dione 17-ethylene ketal (VII), obtained in Example 18, was introduced into a solution of 200 mg. of lithium aluminum hydride in 25 ml. of ether and the reaction was allowed to proceed at reflux for 2 hours. The reaction mixture was chilled and the excess lithium aluminum hydride was destroyed by the addition of 5 ml. of ethyl acetate, followed by 2 ml. of water. The thus-obtained mixture was then filtered and the filtrate taken to dryness under reduced pressure to yield a residue comprising 3α,11β-dihydroxy-5α-androstan-17-one 17-ethylene ketal (VIII) which was used in the following example without further purification.

EXAMPLE 20

*(Reaction 8). — 3α,11β-Dihydroxy-5α-Androstan-17-One (IX)*

The residue comprising 3α,11β-dihydroxy-5α-androstan-17-one 17-ethylene ketal (VIII), obtained in Example 19, was dissolved in 10 ml. of acetic acid to which was added 5 ml. of water. The reaction mixture, after standing overnight at room temperature, was diluted with 500 ml. of 4% sodium bicarbonate solution whereupon crystallization took place. The crystalline material was isolated, washed thoroughly with water and taken up in methylene chloride. The thus obtained methylene chloride solution was poured onto a 75 g. Florisil column packed wet with commercial hexanes. The column was developed by eluting over a gradient of from 5 to 20% acetone in commercial hexanes while collecting 24 100-ml. fractions. The eluate fractions were freed of solvent. Those fractions which thin-layer chromatography showed to contain the desired product were combined and recrystallized from acetone to give a first crop of 3α,11β-dihydroxy-5α-androstan-17-one weighing 1.453 g. and melting at 189–192° C. and a second crop of 3α,11β-dihydroxy-5α-androstan-17-one weighing 111 mg. and melting at 190–192.5° C. Four recrystallizations of the second crop from acetone yielded 3α,11β-dihydroxy-5α-androstan-17-one (IX) having a melting point of 192.5–194.5° C., infrared absorption bands (Nujol) at 3520, 3380, 1740 and 1727 cm.$^{-1}$ and the following analysis:

*Analysis.*—Calcd. for $C_{19}H_{30}O_3$: C, 74.47; H, 9.87. Found: C, 74.36; H, 9.88.

We claim:

1. 2α - fluoro-3α-hydroxy - 5α - androstane-11,17-dione 17-ethylene ketal.
2. 2α-fluoro - 3α,11β - dihydroxy-5α - androstan-17-one 17-ethylene ketal.
3. 2α-fluoro-3α,11β-dihydroxy-5α-androstan-17-one.
4. 3α-hydroxy-5α-androstane - 11,17-dione 17-ethylene ketal.
5. 3α,11β-dihydroxy-5α - androstan-17-one 17-ethylene ketal.
6. Compounds of the formulae

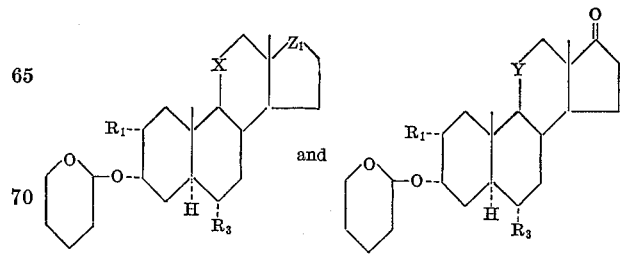

wherein $R_1$ is hydrogen and $R_3$ is selected from the group consisting of hydrogen and methyl, with the proviso that at least one but not both of $R_1$ and $R_3$ are hydrogen; X is selected from the group consisting of

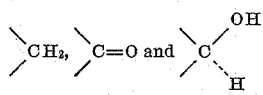

Y is selected from the group consisting of >$CH_2$ and >C=O; and $Z_1$ is selected from the group consisting of

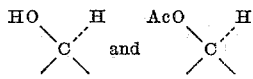

wherein Ac is the acyl radical of a hydrocarbon carboxylic acid containing from 1 to 12 carbon atoms, inclusive.

7. Compounds of the formulae

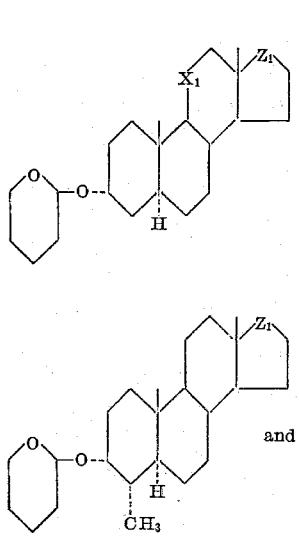

and

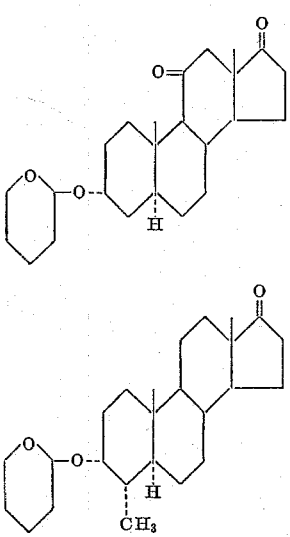

wherein $X_1$ is selected from the group consisting of

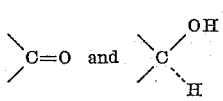

and $Z_1$ is selected from the group consisting of

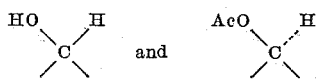

wherein Ac is the acyl radical of a hydrocarbon carboxylic acid containing from 1 to 12 carbon atoms, inclusive.

8. Compounds of the formulae

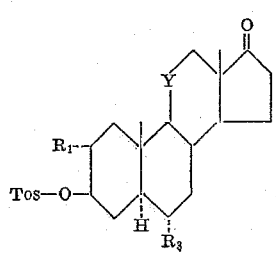

and

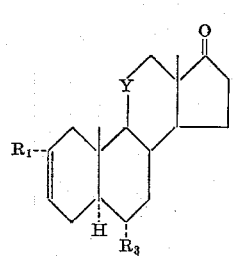

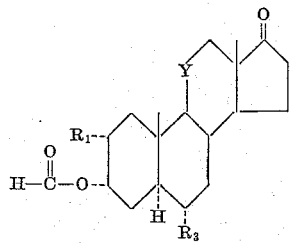

wherein $R_1$ is hydrogen and $R_3$ is methyl, Y is selected from the group consisting of >$CH_2$ and >C=O, and Tos is the tosyl radical.

9. 2α-fluoro-3β-hydroxy-5α-androstan-17-one 3-p-tosylate.

10. Compounds of the formulae

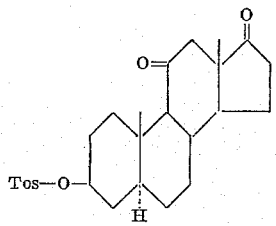
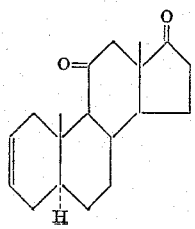

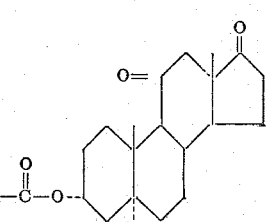
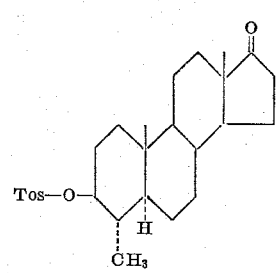

and

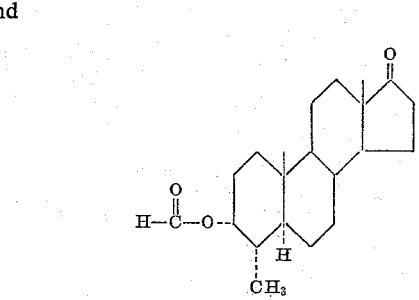

wherein Tos is the tosyl radical.

11. 5α-androst-2-ene-11,17-dione.

References Cited by the Examiner
UNITED STATES PATENTS

| | | | |
|---|---|---|---|
| 3,009,934 | 11/1961 | Counsel et al. | 260—397.4 |
| 3,055,916 | 9/1962 | Bowers et al. | 260—397.3 |
| 3,104,244 | 9/1963 | Counsel et al. | 260—397.3 |
| 3,169,136 | 2/1965 | Bowers et al. | 260—397.3 |

OTHER REFERENCES

Fieser et al.; "Steroids" (1959), Reinhold Publishing Co., pages 405, 505, 506, 519, and 533 relied on.

"Journal Clinical Endocrinol, Metab," vol. 22 (1962), pages 1090–1094 relied on. CA-vol. 58, 11, 785(c).

LEWIS GOTTS, *Primary Examiner.*

ELBERT L. ROBERTS, *Assistant Examiner.*